United States Patent
Heindel et al.

(10) Patent No.: US 10,771,797 B2
(45) Date of Patent: Sep. 8, 2020

(54) ENHANCING A CHROMA-SUBSAMPLED VIDEO STREAM

(71) Applicant: LogMeIn, Inc., Boston, MA (US)

(72) Inventors: Andreas Erwin Heindel, Erlangen (DE); Benjamin Prestele, Dresden (DE); Alexander Gehlert, Radeberg (DE); André Kaup, Effeltrich (DE)

(73) Assignee: LogMeIn, Inc., Boston, MA (US)

( * ) Notice: Subject to any disclaimer, the term of this patent is extended or adjusted under 35 U.S.C. 154(b) by 32 days.

(21) Appl. No.: 16/049,072

(22) Filed: Jul. 30, 2018

(65) Prior Publication Data
US 2020/0036989 A1 Jan. 30, 2020

(51) Int. Cl.
*H04N 19/34* (2014.01)
*H04N 19/36* (2014.01)
*H04N 19/33* (2014.01)
*H04N 19/146* (2014.01)
*H04N 19/186* (2014.01)
*H04N 19/59* (2014.01)
*H04N 19/187* (2014.01)

(52) U.S. Cl.
CPC ........... *H04N 19/34* (2014.11); *H04N 19/146* (2014.11); *H04N 19/186* (2014.11); *H04N 19/187* (2014.11); *H04N 19/33* (2014.11); *H04N 19/59* (2014.11)

(58) Field of Classification Search
CPC ..... H04N 19/34; H04N 19/186; H04N 19/187
See application file for complete search history.

(56) References Cited

U.S. PATENT DOCUMENTS

| 7,864,849 B2 * | 1/2011 | Park | H04N 19/105 |
| | | | 375/240.13 |
| 8,737,474 B2 * | 5/2014 | Gao | H04N 19/61 |
| | | | 375/240.15 |
| 9,813,721 B2 * | 11/2017 | Schulze | H04N 19/132 |
| 9,955,174 B2 * | 4/2018 | Ye | H04N 19/186 |
| 10,390,029 B2 * | 8/2019 | Ye | G06T 9/40 |

(Continued)

OTHER PUBLICATIONS

Color gamut scalable video coding; Jan. 2013; Kerofsky; et al. (Year: 2013).*

(Continued)

*Primary Examiner* — Luis Perez-Fuentes
(74) *Attorney, Agent, or Firm* — BainwoodHuang (57) ABSTRACT

Techniques are provided for sending and receiving digital video in high-quality compressed form over a network. Such techniques may include (a) performing chroma subsampling on an original video stream to yield an altered video stream; (b) applying video compression to the altered video stream to yield a compressed base layer (BL) stream; (c) creating an enhancement layer (EL) stream based on differences between the original video stream and a decompressed version of the BL stream, the EL stream including additional chroma information, which, when combined with the BL stream, encodes a video stream that has higher chroma fidelity to that of the original video stream than does the BL stream alone; and (d) sending both streams to a receiver device across the network to enable the receiver device to generate a version of the original video stream by combining the BL stream with the EL stream's additional chroma information.

19 Claims, 6 Drawing Sheets

(56) References Cited

U.S. PATENT DOCUMENTS

| | | | |
|---|---|---|---|
| 2010/0020866 A1* | 1/2010 | Marpe | H04N 19/187 375/240.02 |
| 2010/0046612 A1* | 2/2010 | Sun | H04N 19/187 375/240.02 |
| 2015/0271509 A1* | 9/2015 | Minoo | H04N 19/187 375/240.29 |
| 2016/0198158 A1 | 7/2016 | Wige et al. | |
| 2017/0352062 A1 | 12/2017 | Vermeir | |
| 2018/0109800 A1* | 4/2018 | Kazui | H04N 19/33 |
| 2018/0167631 A1 | 6/2018 | Schulze et al. | |
| 2018/0176279 A1 | 6/2018 | Chalmers et al. | |

OTHER PUBLICATIONS

Color gamut scalable video coding using 3D LUT; Aug. 2013; Bordes; et al. (Year: 2013).*

D. Sarfi, et al., "Manipulating Shared Screen Content," U.S. Appl. No. 15/851,321, filed Dec. 21, 2017.

A. Heindel, et al., "A low-complexity metric for the estimation of perceived chrominance sub-sampling errors in screen content images," 2017 IEEE International Conference on Image Processing (ICIP), Sep. 2017, pp. 3225-3229, IEEE.

H. Yang, et al., "Subjective quality assessment of screen content images," Sixth International Workshop on Quality of Multimedia Experience (QoMEX), Sep. 2014, pp. 257-262, IEEE.

"Subjective video quality assessment methods for multimedia applications," ITU-T Recommendation p. 910, Apr. 2008, 42 pages, International Telecommunication Union, Geneva.

S. Shi, et al., "Study on Subjective Quality Assessment of Screen Content Images," Proc. Picure Coding Symposium (PCS), May 2015, pp. 75-79, IEEE.

T. Vermeir, et al., "Guided Chroma Reconstruction for Screen Content Coding," IEEE Transactions on Circuits and Systems for Video Technology, Oct. 2016, pp. 1884-1892, vol. 26, No. 10, IEEE.

Y. Itoh, et al., "Up-sampling of YCbCr4:2:0 Image Exploiting Inter-color Correlation in RGB Domain," IEEE Transactions on Consumer Electronics, Nov. 2009, pp. 2204-2210, vol. 55, No. 4, IEEE.

M. Zhao, et al., "Content-adaptive up-scaling of chrominance using classification of luminance and chrominance data," Proceedings of SPIE VCIP, 2004, pp. 721-730.

* cited by examiner

ENHANCING A CHROMA-SUBSAMPLED VIDEO STREAM

BACKGROUND

Screen sharing is a common feature of many software applications, such as remote desktop, web conferencing, and web presentation applications. Such software applications typically involve a host machine, such as a computer, which may share screen content with one or more client machines. The shared screen content may include the host machine's entire desktop or selected portions thereof, such as content of one or more applications or monitors.

In some arrangements, screen sharing applications compress the shared screen content using still-image compression. For example, the screen sharing application may compress the shared screen at one moment in time using still-image compression techniques and send updates regarding particular blocks of pixels within the shared screen as changes occur. In other arrangements, video codecs compress the screen content using a combination of intra-frame and inter-frame encoding techniques.

SUMMARY

Many modern video codecs are designed to operate within so-called profiles that provide different coding features with respective levels of quality and performance. Low-complexity profiles are often used to compress video for transmission over low-bandwidth connections or for use with devices having reduced computing power, while high-complexity profiles are often used to compress video for transmission over high-bandwidth connections or when quality is paramount. Unfortunately, many client devices (e.g., cell phones, tablets, some laptops, etc.) are configured to decode only the low-complexity profiles of various video codecs. These low-complexity profiles often require chroma sub sampling and do not support fully-sampled video streams. Chroma subsampling encodes chrominance portions of a video signal at a lower spatial resolution than it uses to encode luminance portions of the video signal, since the human eye is more sensitive to luminance than to chrominance. Use of chroma subsampling is generally acceptable (and not easily detected) for natural video of the real world captured by video cameras. However, chroma subsampling, and especially extreme chroma subsampling (e.g., 4:2:0 or 4:1:1), may introduce substantial artifacts when applied to content having high-contrast, sharp edges (e.g., text and synthetic graphics), as is typical in desktop screens. In contrast, higher profiles of many codecs that support either less extreme chroma subsampling (e.g., 4:2:2) or no chroma subsampling may not be supported by all decoders, or they may not provide the necessary performance to allow for real-time screen sharing at acceptable quality (e.g., frames may need to be dropped due to high encoding complexity or bandwidth constraints).

It is possible to simultaneously broadcast both a highly-compressed chroma-subsampled video stream and a higher-quality video stream that is sampled at full chrominance (chroma) resolution so that the appropriate stream may be utilized by each receiver. However, this simulcast approach is very inefficient in terms of computational resources and network bandwidth requirements.

It is also possible to use scalable video encoding to encode a low-bandwidth base layer as well as an enhancement layer that includes additional information to provide enhanced quality. Typical solutions allow for scalability in terms of spatial resolution (e.g. scale from standard definition to high definition streams) or temporal resolution (e.g. scale from low- to high-frame rates) depending on available bandwidth and target device capabilities. However, because chroma subsampling is typically performed outside of a conventional codec prior to video compression, both the base layer and the enhancement layer in conventional scalable video encoding systems have the same chroma resolution. In order to be compatible with exclusively low-complexity decoding devices, a conventional enhancement layer may therefore still suffer from artifacts due to chroma sub sampling.

Thus, it would be desirable to implement an enhancement layer that is configured to provide enough information to allow a client device to generate a reconstructed version of the original video (e.g., of a shared desktop screen) while reducing or eliminating the artifacts introduced by chroma subsampling of a compressed base layer of the transmitted video. This result may be accomplished by generating the enhancement layer based on both the original video (prior to chroma subsampling) and a decoded version of the chroma-subsampled base layer using an enhancement layer encoder. Since the enhancement layer encoder has access to the artifact-free video prior to chroma subsampling, it is able to use techniques described herein to enhance the base layer with better chroma data. The enhancement layer stream output by the enhancement layer encoder may be sent to compatible client devices together with the base layer to allow the decoded chroma-subsampled video to be enhanced at the client to provide higher chroma fidelity. It should be understood that client devices that are not capable of decoding the enhancement layer are still able to decode the standard-compliant chroma-subsampled base layer only.

In one embodiment, a method, performed by a computing device, of sending digital video in high-quality compressed form over a network is provided. The method includes (a) performing chroma subsampling on an original video stream to yield an altered video stream whose chroma resolution is lower than its luma resolution; (b) applying video compression to the altered video stream to yield a compressed base layer (BL) stream; (c) creating an enhancement layer (EL) stream based on differences between the original video stream and a decompressed version of the BL stream, the EL stream including additional chroma information, which, when combined with the BL stream, encodes a video stream that has higher chroma fidelity to that of the original video stream than does the BL stream alone; and (d) sending both the BL stream and the EL stream to a receiver device across the network to enable the receiver device to generate a version of the original video stream by combining the BL stream with the additional chroma information of the EL stream. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for implementing an enhancement layer that is configured to provide enough information to allow a client device to generate a reconstructed version of the original video (e.g., of a shared desktop screen) while reducing or eliminating the artifacts introduced by chroma subsampling of a compressed base layer of the transmitted video. This result may be accomplished by generating the enhancement layer based on both the original video (prior to chroma subsampling) and a decoded version of the chroma-subsampled base layer using an enhancement layer encoder. Since the enhancement layer encoder has access to the artifact-free video prior to chroma subsampling, it is able to use techniques described herein to enhance the base layer with better chrominance data. The enhancement layer stream output by the enhancement layer encoder may be sent to compatible client devices together with the base layer to allow the decoded chroma-subsampled video to be enhanced at the client to provide higher chroma fidelity.

Figure 1:
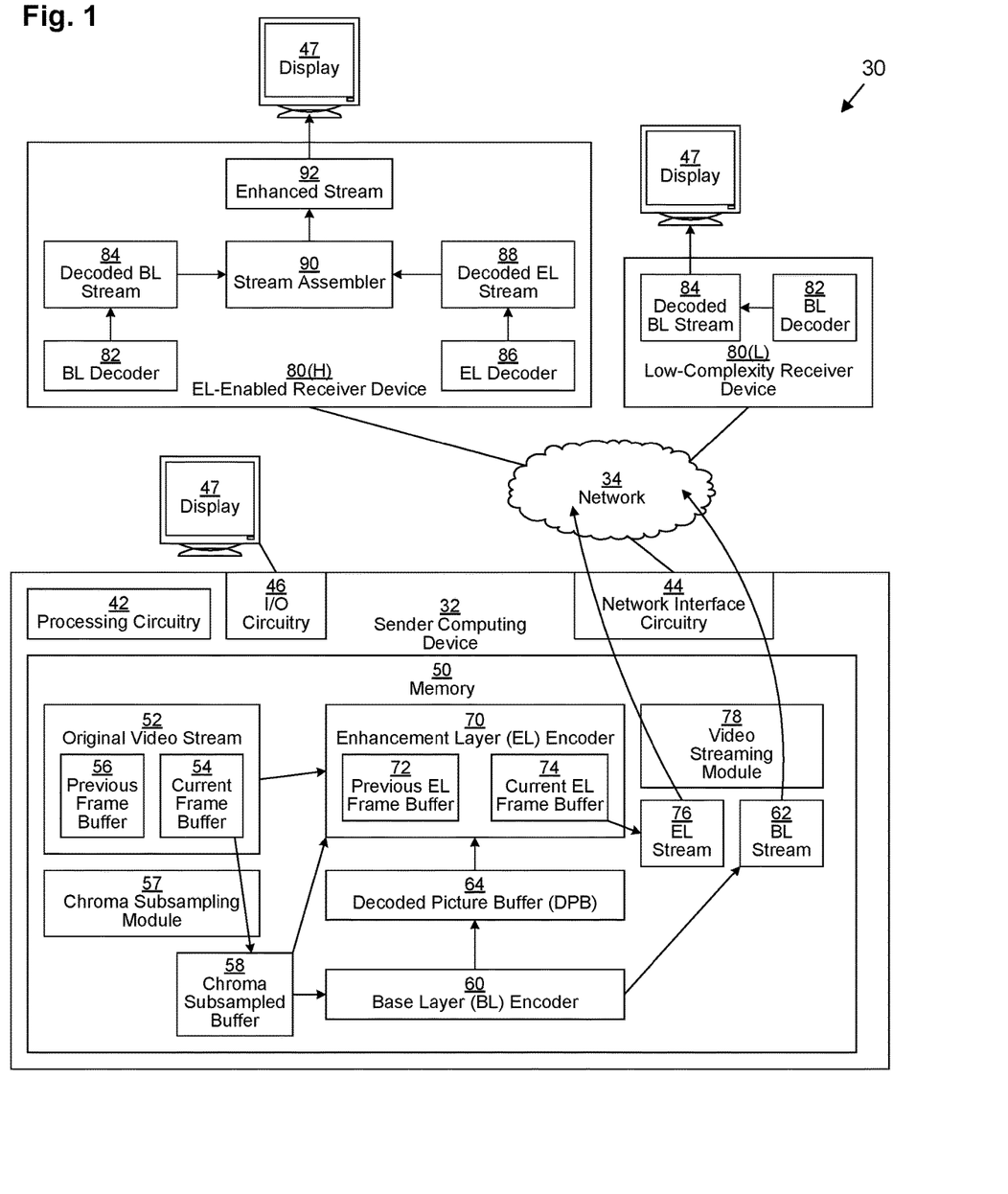
FIG. 1 is a block diagram depicting an example system and apparatus for use in connection with various embodiments.

FIG. 1 depicts an example environment 30 including a sender computing device 32 (hereinafter "sender device 32"). Sender device 32 may be any kind of computing device, such as, for example, a personal computer, workstation, server computer, enterprise server, laptop computer, tablet computes, smart phone, mobile computer, etc.

Sender device 32 includes processing circuitry 42, network interface circuitry 44, display interface circuitry 46, and memory 50. Sender device 32 may also include other components as are well-known in the art, including interconnection circuitry.

Processing circuitry 42 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 44 may include one or more Ethernet cards, cellular modems, Fibre Channel (FC) adapters, Wireless Fidelity (Wi-Fi) wireless networking adapters, and/or other devices for connecting to a network 34. Network interface circuitry 44 allows the sender device 32 to communicate with one or more receiver devices 80 over network 34.

The network 34 may be any type of network or combination of networks, such as a local area network (LAN), a wide area network (WAN), the Internet, and/or some other type of network or combination of networks, for example. The receiver devices 80 and sender device 32 may connect to the network 34 using various technologies, such as TCP, UDP, RTP, or HTTP, for example. Any number of receiver devices 80 and sender device 32 may be provided, using any of the above protocols, some subset thereof, or other protocols besides those shown. In some embodiments, environment 30 may represent a corporate networking system in which communication between the sender device 32 and the receiver devices 80 is internal to a single entity such as a corporation.

Display interface circuitry 46 may include any kind of display bus technology, such as, for example, VGA, DVI, HDMI, and/or DisplayPort or any similar bus for connecting to and controlling a display device 47 (e.g., an LCD, CRT, or LED screen, a video projector, a headset, etc.) as is well-known in the art. Within the scope of this document, displaying a video stream on display device 47 incorporates any intermediate steps, including optional ones, to eventually present the video to a user of a receiver device 80 (such as copying the video stream to an intermediate buffer in volatile memory or into a file in persistent storage, to draw the video into a framebuffer of a window manager, or to transfer it to an application like a web browser for further processing and embedded rendering, etc.).

Memory 50 may be any kind of digital system memory, such as, for example, random access memory (RAM). Memory 50 stores an operating system (OS, not depicted) in operation (e.g., a Linux, UNIX, Windows, MacOS, or similar operating system kernel). Memory 50 also stores a chroma subsampling module 57, a base layer (BL) encoder 60, an enhancement layer (EL) encoder 70, and a video streaming module 78, each of which executes on processing circuitry 42 to perform one or more aspects of various embodiments. Memory 50 also stores an original video stream 52, a chroma subsampled buffer 58, a decoded picture buffer (DPB) 64, a BL stream 62, and an EL stream 76. Memory 50 may also store various other data structures used by the OS, the chroma subsampling module 57, the BL encoder 60, the EL encoder 70, the video streaming module 78, and various other applications (not depicted).

In some embodiments, memory 50 may also include a persistent storage portion (not depicted). Persistent storage portion of memory 50 may be made up of one or more persistent storage devices, such as, for example, disks. Persistent storage portion of memory 50 is configured to store programs and data even while the sender device 32 is powered off. The OS, the chroma subsampling module 57, the BL encoder 60, the EL encoder 70, the video streaming module 78, and other applications are typically stored in this persistent storage portion of memory 50 so that they may be loaded into a system portion of memory 50 from this persistent storage portion of memory 50 upon a system restart or as needed. The chroma subsampling module 57, the BL encoder 60, the EL encoder 70, and the video streaming module 78, when stored in non-transient form either in the volatile portion of memory 50 or in the persistent portion of memory 50, each form a computer program product. The processing circuitry 42 running one or more applications thus forms a specialized circuit constructed and arranged to carry out the various processes described herein. In some embodiments, one or more of the BL encoder 60, EL encoder 70, and video streaming module 78 may be implemented in hardware or in a combination of software and hardware.

In operation, a user (not depicted) operates sender device 32 to share contents of a desktop screen (as seen on display 47) with one or more remote receiver devices 80 so that users (not depicted) of those respective devices 80 are able to view the same screen on their own displays 47. It should be understood that although described as being a desktop screen as depicted on local display 47, the content of what is being shared may differ in other embodiments. Thus, in some embodiments, only a portion of the desktop screen (e.g., a window) are shared, while, in other embodiments, the content may be provided by an application in real-time, or be a pre-recorded file. It may also be a video captured by an HDMI grabber or any other device (e.g. a camera) attached to the sender device 32.

The contents of the shared screen form an original video stream 52, which is made up of a succession of frames that each represent the state of the shared screen at a given instant in time. Various frame rates are possible: in some embodiments, original video stream 52 is configured to operate at a fixed framerate (e.g., 30 frames per second (fps) or 60 fps), while, in other embodiments, new frames are only captured when the screen content changes (i.e., variable frame rate). Memory 50 stores a current frame of the original video stream 52 in a current frame buffer 54. Memory 50 also stores the immediately previous frame of the original video stream 52 in a previous frame buffer 56. In some embodiments, additional frames are maintained in additional buffers (not depicted) within memory 50 for some amount of time.

The size of each frame of the original video stream 52 may be constant or it may vary. For example, the size may be 1,920 by 1,080 pixels (i.e., a common display resolution for a display 47) when sharing a full screen, less in the case of sharing only an application window, or even more in the case of multi-display setups. The size may change at any time, for example, when the user decides to resize an application window that is currently being shared. The pixels within the original video stream 52 may be configured differently in different embodiments. In some embodiments, each pixel is a 24-bit value that uses 8 bits to represent each of three colors (e.g., red, green, and blue, referred to as "RGB"). In other embodiments, each pixel may have a different bit depth per channel. In other embodiments, each channel may have a different representation, such as one luminance (or "luma") channel and two chrominance (or "chroma") channels. In other embodiments, each pixel may be configured to use another number of channels, such as one, two, four, etc. channels.

Chroma subsampling module 57 operates to convert the current frame buffer 54 into a chroma subsampled buffer 58, which stores a representation of the same frame as represented by the current frame buffer 54 but with a different representation of the constituent pixels. In some embodiments, chroma subsampling module 57 first converts the image of the current frame buffer 54 from the RGB domain into a chroma/luma domain. Once in the chroma/luma domain, chroma subsampling module 57 downsamples the chroma channels (or channel) to be at a lower resolution than the luma channel. For example, in one embodiment, 4:2:0 chroma subsampling is used. Thus, if the original video stream 52 is 1,920×1,080 pixels, the luma channel of the chroma sub sampled buffer remains at 1,920×1,080 pixels, but each chroma channel has a lower resolution of 960×540 pixels, each chroma pixel representing a screen area equivalent to the screen area of four luma channel pixels, computed over a specific sampling grid as a weighted average of the underlying pixel chroma values. Other embodiments may use different subsampling strategies in terms of subsampling resolution, the topology of the sampling grid, and the computation of the subsampled chroma values. It should be understood that although only one chroma subsampled buffer 58 is depicted, in some embodiments, several chroma subsampled buffers 58 may be maintained in memory 50 at a time, each representing a different frame of the original video stream 52. In some embodiments, instead of converting from RGB to the chroma/luma domain first and then performing chroma subsampling of the chroma channels, chroma subsampling module 57 first creates the luma channel, then performs sub sampling of the original RGB data, and then converts the subsampled RGB data into the chroma domain. It should be understood that the chroma and luma channels may be linear or non-linearly gamma-corrected as is well-known in the art.

BL encoder 60 operates on the chroma subsampled buffer 58 (or, in some embodiments, the chroma subsampled buffers 58 of several frames at once) to generate a BL stream 62 made up of compressed versions of the frames of the original video stream 52 but at the chroma sub sampled resolution. BL encoder 60 may also be referred to as a "codec." Various compression schemes may be used, such as, for example, VP9, H.264/AVC, H.265/HEVC, or any video compression scheme now known or which may exist in the future. Typically, BL encoder 60 is configured to output the BL stream 62 using a low-complexity profile of such video compression scheme that is only compatible with chroma-subsampled video. Because screen sharing is often desired to be accomplished in real-time, BL encoder 60 may use a real-time single-pass encoding scheme in some embodiments.

Video streaming module 78 operates to stream the BL stream 62 over the network 34 for reception by the various receiver devices 80. A low-complexity receiver device 80(L) that is configured according to a basic configuration may operate to receive only the BL stream 62. Such a low-complexity receiver device 80(L) may operate a BL decoder 82 (e.g., a VP9, H.264/AVC, H.265/HEVC, etc. decoder) to decode the BL stream 62 into a decoded BL stream 84 that it then renders on a local display 47. It should be understood that the decoded BL stream 84 that is displayed by a low-complexity receiving device 80(L) may include significant artifacts due to the use of chroma subsampling, especially when the shared screen content includes high-contrast, sharp edges (e.g., text and synthetic graphics), as is typical in desktop screens.

BL encoder 60 also operates to generate its own decoded BL stream, rendering each frame of such stream into DPB 64. It should be understood that although only one DPB 64 is depicted, in some embodiments, several DPBs 64 may be maintained in memory 50 at a time, each representing a different frame of the original video stream 52.

EL encoder 70 is configured to operate on both the original video stream 52 and the DPB 64 to generate an EL stream 76 that contains additional information that allows an EL-enabled receiver device 80(H) to construct and display an enhanced stream 92 of video that has higher chroma fidelity to that of the original video stream 52 than does the BL stream 62 alone, therefore being less prone to artifacts caused by chroma subsampling. As each frame of the BL stream 62 is decoded into the DPB 64, EL encoder 70 may encode enhancement information for that frame into a current EL frame buffer 74, which is then inserted (in compressed form) into EL stream 76. EL encoder 70 is able to generate this enhancement information by comparing the contents of the DPB 64 against the current frame buffer 54 of the original video stream 52 and including mapping information that allows at least a partial reconstruction of the higher chroma resolution of the original video stream 52 within the current EL frame buffer 74. It should be understood that, if the BL encoder 60 cannot expose its DPB 64 to the EL encoder 70 (e.g. because BL encoder 60 is implemented in hardware and DPB 64 resides in inaccessible memory), the EL encoder 70 may functionally equivalently maintain its own instance of the DPB 64, by running the encoded BL stream 62 through a dedicated BL decoder (like BL decoder 82) to fill its own instance of the DPB 64. EL encoder 70 may also maintain one or more previous EL frame buffers 72 that represent the enhancement information that was previously included within EL stream 76 for previous frames of the BL stream 62.

Video streaming module 78 also operates to stream the EL stream 76 over the network 34 for reception by receiver devices 80 such as EL-enabled receiver device 80(H). It should be understood that there are various ways to transmit EL stream 76. In one embodiment, the Video streaming module 78 may send the EL stream 76 over the same network and use the same transmission protocols as used for the BL stream 62, while in other embodiments it may use a different network and/or a different transmission protocol. The video streaming module 78 may also choose protocols that allow joining or multiplexing BL stream 62 and EL stream 76 into a combined network stream for joint transport over the network 34. In these embodiments, the receiver devices 80 may demultiplex the two streams 62, 76 apart. An EL-enabled receiver device 80(H) that is configured according to a more advanced configuration may operate to receive both the BL stream 62 and the EL stream 76. Such an EL-enabled receiver device 80(H) may operate a BL decoder 82 (e.g., a VP9, H.264/AVC, H.265/HEVC, etc. decoder) to decode the BL stream 62 into a decoded BL stream 84. However, in contrast to a low-complexity receiver device 80(L), an EL-enabled receiver device 80(H) may operate an EL decoder 86 to decode the EL stream 76 into a decoded EL stream 88. EL-enabled receiver device 80(H) may also operate a stream assembler 90 that combines the decoded BL stream 84 with the decoded EL stream 88 in order to generate the enhanced stream 92 that may then be rendered on a display 47.

BL decoder 82, EL decoder 86, and stream assembler 90 are typically implemented as programs which execute on processing circuitry of a receiver device 80. BL decoder 82, EL decoder 86, and stream assembler 90, when stored in non-transient form either in a volatile portion of memory or in a persistent portion of memory of a receiver device 80, each form a computer program product. In some embodiments, one or more of BL decoder 82, EL decoder 86, and stream assembler 90 may be implemented in hardware or in a combination of software and hardware.

Figure 2:
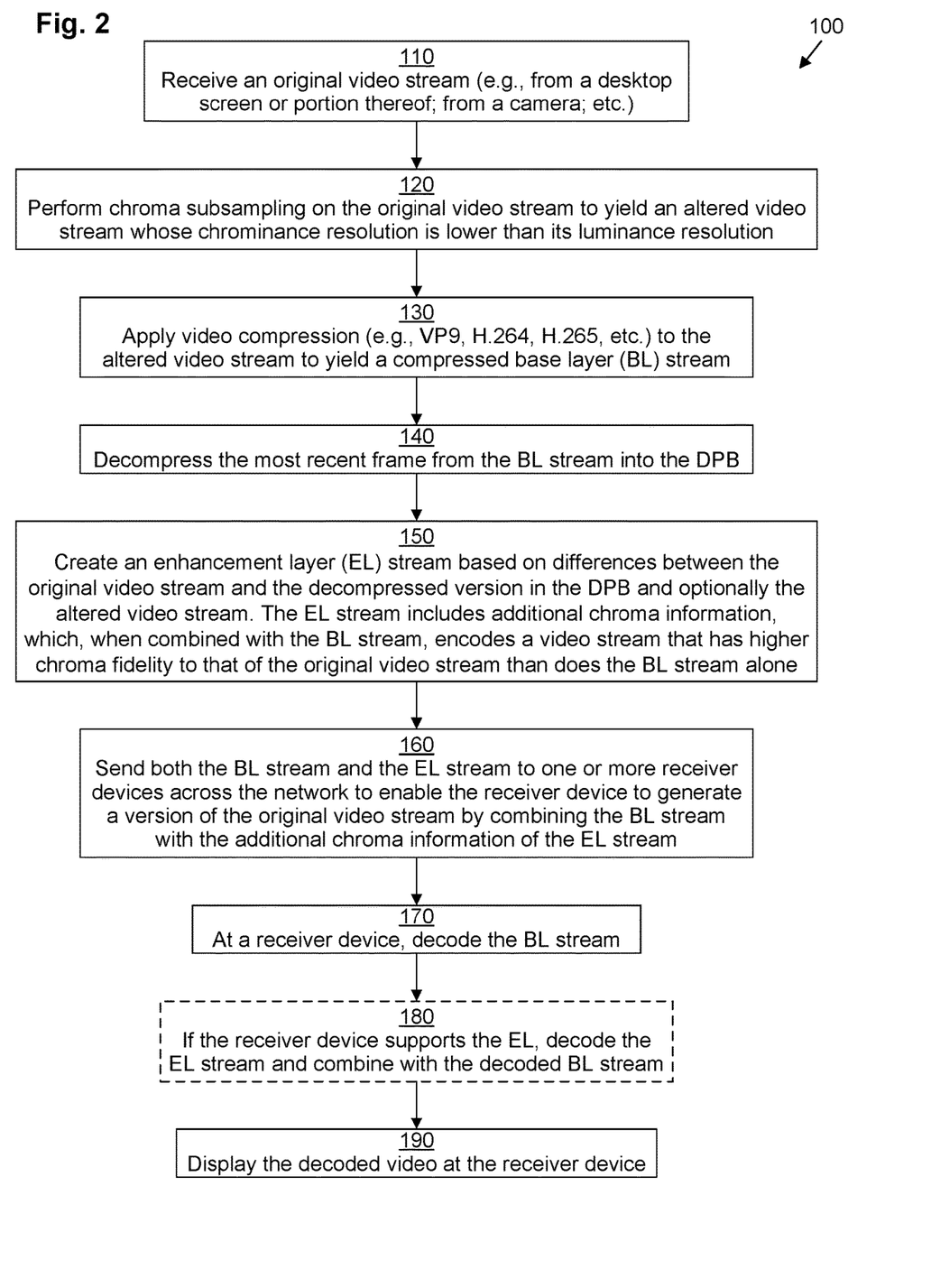
FIG. 2 is a flowchart depicting example methods of various embodiments.

FIG. 2 illustrates an example method 100 performed by sender device 32 and one or more receiver devices 80 for streaming a video (e.g., of a shared desktop screen) across network 34 that allows for enhancing a low-complexity profile BL stream 62 with chroma enhancement information provided by an EL stream 76 that is interpretable by a EL-enabled receiver device 80(H). It should be understood that any time a piece of software (e.g., chroma subsampling module 57, BL encoder 60, EL encoder 70, or video streaming module 78) is described as performing a method, process, step, or function, in actuality what is meant is that a computing device (e.g., sender device 32) on which that piece of software is running performs the method, process, step, or function when executing that piece of software on its processing circuitry 42. It should be understood that one or more of the steps or sub-steps of method 100 may be omitted in some embodiments. Similarly, in some embodiments, one or more steps or sub-steps may be combined together or performed in a different order. Step 180 of method 100, which is marked with dashed lines, may be deemed to be either optional or representative of alternative embodiments.

Steps 110-160 are performed by sender device 32, while steps 170-190 are performed by one or more of the receiving devices 80.

In step 110, sender device 32 receives an original video stream 52. This original video stream 52 may be received from various sources using various capturing and transmission techniques. In some embodiments, for example, the original video stream 52 may be received from an HDMI grabber, camera, or other capture device (not depicted) or a driver configured to output the video recorded by such an attached capture device (not depicted). In other embodiments, this original video stream 52 may be read from a file, or it may be received from the OS, an application, or a display driver that renders a desktop onto local display 47. In some embodiments, this original video stream is in the RGB domain, while, in other embodiments, it is in a luma/chroma domain without chroma subsampling (or with only minimal subsampling, such as using 4:2:2 chroma subsampling). In yet other embodiments, other formats may be used, such as HSV, HSL, HIS, XYZ, CMY, CMYK, etc. as is well-known in the art.

In step 120, chroma subsampling module 57 operates to perform chroma subsampling (which may include one or more color space conversions) on the original video stream 52 to yield an altered video stream whose chroma resolution is lower than its luma resolution. Chroma subsampling module 57 stores this altered video stream within the chroma subsampled buffer 58.

For example, if the original video stream 52 is in the luma/chroma domain using 4:4:4 sampling, chroma subsampling module 57 reduces the resolution of the chroma channel(s) to half (4:2:2), a quarter (4:2:0 or 4:1:1), or an eighth (4:1:0) of the luma resolution. If the original video stream 52 was already chroma subsampled to 4:2:2, chroma subsampling module 57 further reduces the resolution of the chroma channel(s) to a quarter (4:2:0 or 4:1:1) or an eighth (4:1:0) of the luma resolution. If the original video stream 52 is in the RGB domain, chroma subsampling module 57 may first convert it into the luma/chroma domain. It should be understood that the subsampling and color format output of the chroma subsampling module 57 corresponds to what the BL codec requires to operate within the respective coding profile and configuration.

In step 130, BL encoder 60 applies video compression (e.g., VP9, H.264/AVC, H.265/HEVC, etc.) to the altered video stream to yield a compressed BL stream 62. In some embodiments, real-time single pass encoding is used. In some embodiments, a low-complexity profile of a codec is employed so that the BL stream 62 may be received and decoded by a low-complexity receiving device 80(L).

In step 140, a BL decoder (not depicted), which may be part of BL encoder 60, decodes the most-recently encoded frame of the BL stream 62 into the DPB 64 so that it is available to the EL encoder 70 for comparison against the current frame buffer 54 of the original video stream 52.

In step 150, EL encoder 70 creates EL stream 76 based on differences between the original (full-chrominance) video stream 52, optionally the altered (chroma subsampled) video stream (found within the chroma subsampled buffer 58), and the decompressed version of the BL stream 62 (found in the DPB 64). The EL stream 76 includes additional chroma information, which, when combined with the BL stream 62, encodes a video stream 92 that has higher chroma fidelity to that of the original video stream 52 than does the BL stream 62 alone. Further detail with respect to step 150 is provided below in connection with FIG. 3.

In step 160, video streaming module 78 sends both the BL stream 62 and the EL stream 76 to one or more receiver devices 80 across network 34. Thus, an EL-enabled receiver device 80(H) is able to generate a high-fidelity enhanced video stream 92 using both streams 62, 76, while a low-complexity receiver device 80(L) may utilize only the BL stream 62 for a lower-fidelity output. In some embodiments, video streaming module 78 broadcasts or multicasts the streams 62, 76 so that any eligible receiver 80 may receive one or both streams 62, 76. In other embodiments, sender 32 and receiver 80 may negotiate as part of the transmission protocol or over a separate channel (not shown) if the receiver 80 is capable of decoding the EL and wants the EL stream 76 to be transmitted.

In step 170, a receiver device 80 receives the BL stream 62 and operates a BL decoder 82 to decode the received BL stream 62 to yield a decoded BL stream 84.

In step 180, which is only performed if the receiver 80 is an EL-enabled receiver device 80(H), the EL-enabled receiver 80(H) receives the EL stream 76 and operates an EL decoder 86 to decode the received EL stream 76 to yield a decoded EL stream 88. The EL-enabled receiver 80(H) also operates a stream assembler 90 to combine the decoded EL stream 88 with the decoded BL stream 84. Thus, enhanced stream 92 is created having higher chroma fidelity to the original video stream 52 than does the BL stream 62.

Finally, in step 190, the receiver device 80 displays a video stream on its display 47. In the case of a low-complexity receiver device 80(L), it displays the decoded BL stream 84, and in the case of an EL-enabled receiver device 80(H), it displays the enhanced stream 92.

Figure 3:
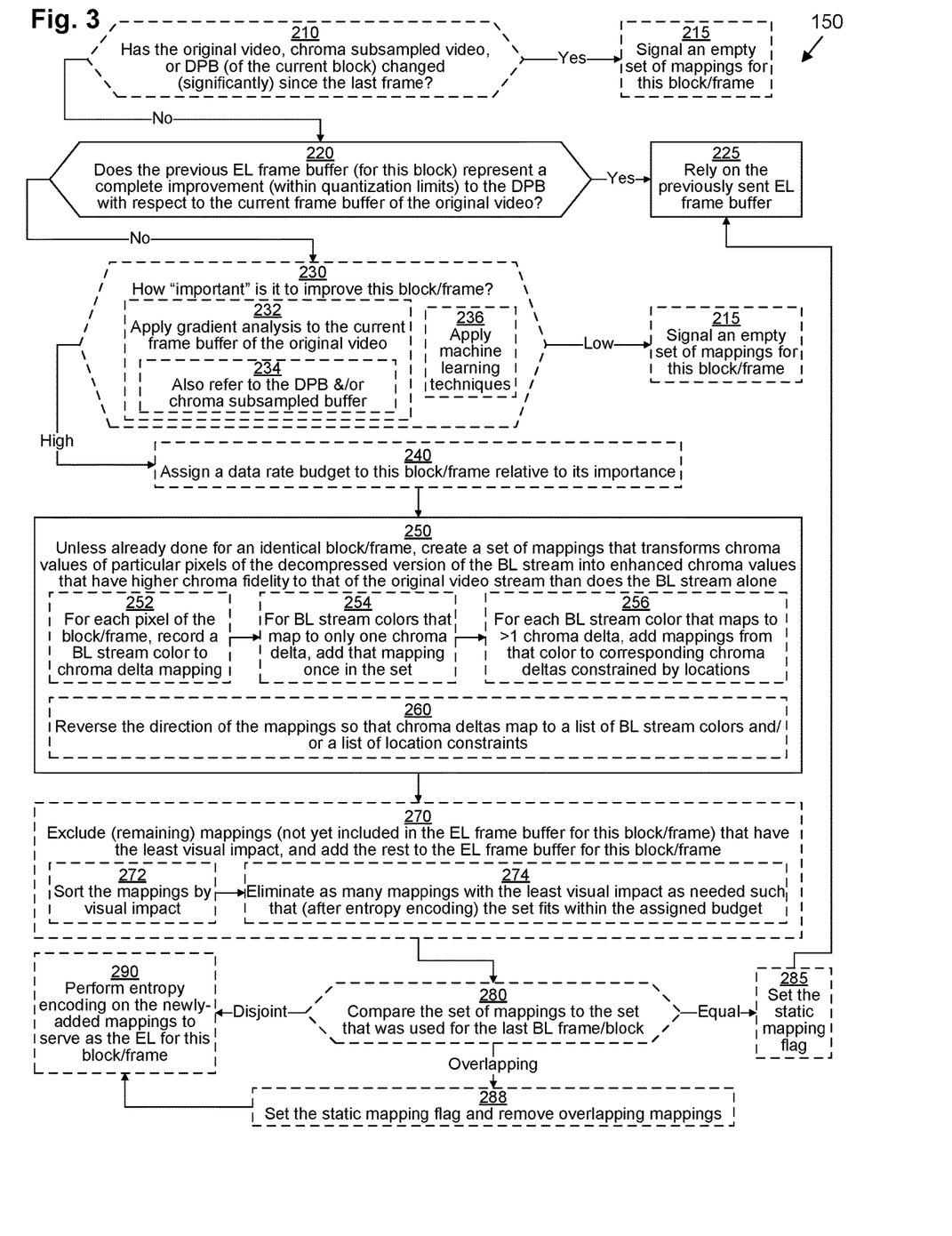
FIG. 3 is a flowchart depicting example methods of various embodiments.

FIG. 3 illustrates additional detail with respect to step 150 according to various embodiments. It should be understood that one or more of the steps or sub-steps of FIG. 3 may be omitted in some embodiments. Some of the steps and sub-steps of FIG. 3 are marked with dashed lines because they may be deemed to be either optional or representative of alternative embodiments.

It should be understood that the method of FIG. 3, which is performed by EL encoder 70, may operate in several different ways. Thus, in some embodiments, EL encoder 70 performs the various steps on each frame of the video separately. In other embodiments, EL encoder 70 divides each frame into blocks and performs the steps of FIG. 3 on each block separately.

Figure 4A:
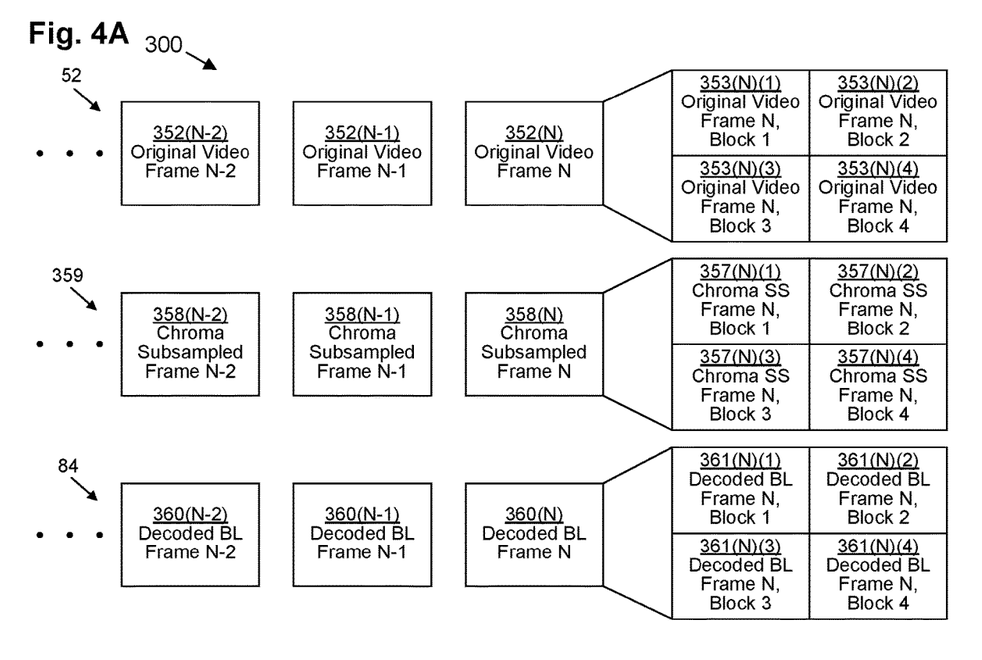
FIGS. 4A, 4B, 4C, and 4D are block diagrams depicting different views of example data structures used in connection with various embodiments.

For example, FIG. 4A depicts an example data structure arrangement 300 that includes the original video stream 52, the altered (chroma-subsampled) video stream 359, and the decoded BL stream 84 (which is equivalent to a set of consecutive sets of DPB 64). Original video stream 52 includes a set of consecutive original video frames 352 up to and including the current video frame 352(N). This set also includes a previous original video frame 352(N−1) and an original frame before that 353(N−2), etc. Altered video stream 359 includes a set of consecutive altered video frames 358 up to and including the current altered video frame 358(N) (which is stored within chroma subsampled buffer 58). This set also includes a previous altered video frame 358(N−1) and an altered frame before that 358(N−2), etc. Decoded BL stream 84 includes a set of consecutive decoded BL frames 360 up to and including the current decoded BL frame 360(N). The set includes a previous original decoded BL frame 360(N−1) and a decoded BL frame before that 360(N−2), etc.

Video frames 352(N), 358(N), 360(N) may be logically divided into several blocks 353, 357, 361 of contiguous pixels. For example, as depicted in FIG. 4A, video frame 352(N) is divided into four blocks 353(N)(1), 353(N)(2), 353(N)(3), 353(N)(4), video frame 358(N) is divided into four blocks 357(N)(1), 357(N)(2), 357(N)(3), 357(N)(4), and video frame 360(N) is divided into four blocks 361(N)(1), 361(N)(2), 361(N)(3), 361(N)(4). There are various ways in which a video frame 352, 358, 360 may be divided into respective blocks 353, 357, 361. In some embodiments, a fixed block size is used (e.g., 16×16 pixels, 64×64 pixels, etc.). In other embodiments, the EL encoder 70 may use varying block sizes.

Returning to FIG. 3, in some embodiments, after BL encoder 60 places the most recent decoded BL frame 360(N) into DPB 64, EL encoder 70 iterates through the various blocks 361 and decides how to encode chroma enhancement information for each block 361 based on the chroma information from its corresponding block 353 within the original video frame 352(N) and/or from its corresponding block 357 within the chroma subsampled frame 358. In other embodiments, EL encoder 70 performs the chroma enhancement for the entire frame 360(N) without breaking it down into constituent blocks 361.

FIG. 3 will be described in the context of being applied to the first block 361(N)(1) of the current BL decoded frame 360(N), but it should be understood that operation on any block 361 within the current BL decoded frame 360(N) is similar. It should also be understood that in embodiments in which the method 150 of FIG. 3 applies to the entire frame 360(N), operation is similar, but applied on a frame-wide basis.

In optional step 210, EL encoder 70 determines whether or not the video has changed since the previous frame. In one embodiment, this is done by determining whether or not the original video content of the block 353(N)(1) within the original video stream 52 to which block 361(N)(1) corresponds has changed since the last frame 352(N−1). This evaluation is accomplished by having the EL encoder compare the blocks 353 within the current frame buffer 54 and the previous frame buffer 56. In another embodiment, step 210 is done by determining whether or not the chroma subsampled video content of the block 358(N)(1) within the chroma subsampled video stream 359 to which block 361(N)(1) corresponds has changed since the last frame 358(N−1). In another embodiment, step 210 is done by determining whether or not the decoded BL video content of the block 361(N)(1) within the decoded BL video stream 84 has changed since the last frame 360(N−1). In other embodiments, step 210 evaluates changes since the last frame N−1 within two or more of the original video stream 52, the chroma subsampled video stream 359, and the decoded BL video stream 84 (e.g., if all three have changed then the result is affirmative, if any of the three have changed then the result is affirmative, if any two of the three have changed then the result is affirmative, etc.). If the video content has changed, then it is likely that the BL stream 62 for the current frame N and block 1 is using up a lot of data rate, so, since the human eye is unlikely to notice an artifact while the video content is changing, bandwidth may be saved by deferring chroma enhancement until the next frame (which will be N+1 if the video content remains the same in the next frame 352(N+1)). Therefore, if the video content has changed, then operation proceeds with step 215, in which no chroma enhancement information for block 361(N)(1) is included within the EL stream 76. In some embodiments, step 215 may include affirmatively signaling an empty set of mappings for block 361(N)(1) rather than merely omitting sending any such mappings. If step 210 has a negative result, then operation proceeds with step 220. It should be understood that in the case of variable framerate, where new frames are only produced when the original video content changes, deferring the chroma enhancement may be limited by a configurable time period as upper bound, after which the operation may proceed with step 220.

In step 220, EL encoder 70 determines whether or not the enhancements within the previous EL frame buffer 72 represent a complete improvement (within quantization limits) to the decoded BL frame block 361(N)(1) with respect to the original video frame block 353(N)(1). There are various ways to make this determination. In one embodiment, if the contents of the block 353(N)(1) have not changed since the previous frame, N−1 (as implied by the fact that step 210 has proceeded to step 220), AND the contents have changed since the frame before that, N−2, then chroma enhancement should begin, so that chroma enhancements can be placed in the current EL frame buffer 74 for inclusion within the EL stream 76. However, even if the contents have not changed since N−2, since it is possible that time or bandwidth limitations prevented the EL stream 76 from including all necessary chroma enhancements in the previous frame buffer 72 (see below at step 270), it is possible that the enhancements within the previous EL frame buffer 72 do NOT represent a complete improvement to the decoded BL frame block 361(N)(1) with respect to the original video frame block 353(N)(1). Thus, either if it is the first time that this identical block 353 is being enhanced or if the enhancement is not yet complete, operation proceeds with step 230. Otherwise, no further enhancement is needed, so operation proceeds with step 225, in which no chroma enhancement information for block 361(N)(1) is included within the EL stream 76 since such enhancement information has already been sent to the receiver device 80, where it has presumably already been buffered.

In optional step 230, EL encoder 70 determines how "important" it is to enhance this block 361(N)(1). It is considered important to enhance a block 361 if it contains content that is commonly subject to human-visible artifacts caused by chroma subsampling. Thus, in some embodiments, step 230 is performed by performing sub-step 232, in which an edge detection algorithm or other form of gradient analysis is applied to the block 353(N)(1), since edges represent discontinuities where it is common for colors (and thus chroma values) to change. In some of these embodiments, sub-step 232 includes sub-sub-step 234 in which gradient analysis is also applied to the decoded BL frame block 361(N)(1) or the chroma subsampled frame block 357(N)(1). Example metrics that make such use of edge detection or gradient analysis include the Perceived Chrominance Sub-sampling Error (PCSE) metrics as described in "A low-complexity metric for the estimation of perceived chrominance sub-sampling errors in screen content images" by Andreas Heindel, et al., published in the Proceedings of the 2017 IEEE International Conference on Image Processing (ICIP) at pages 3225-3229, the entire contents and teachings of which are incorporated herein by this reference. In some embodiments, step 230 is performed by performing sub-step 236, in which machine learning techniques are applied to estimate if the block contains chroma subsampling artifacts that are visible to human viewers.

In some embodiments, if the importance metric of step 230 has a value below a threshold minimum, then the decoded BL frame block 361(N)(1) probably does not contain content that is likely to be subject to chroma subsampling artifacts visible to human viewers, so operation proceeds with step 215, in which no chroma enhancement information for block 361(N)(1) is included within the EL stream 76. Otherwise, operation proceeds with step 240. In other embodiments, step 230 is not a decision step, so operation always proceeds with step 240.

In optional step 240, EL encoder 70 assigns a data rate budget to this block 361(N)(1) based on its relative importance (in comparison to other blocks 361 within this frame 360(N)) and relative to an available data rate. In some embodiments, EL encoder 70 performs step 230 for all blocks 361 within the current encoded BL frame 360 prior to proceeding with step 240 for any of the blocks 361 of that frame 360 so that the metrics of the various blocks 361 can be compared to each other. Thus, for example, suppose that the metric is 0.1 for block 361(N)(1), 0.3 for block 361(N)(2), 0.8 for block 361(N)(3), and 0.9 for block 361(N)(4), with a threshold minimum of 0.15, and a total budget for the current frame 360(N) of 100 kilobytes (KB). In that example, EL encoder 70 might assign a budget of zero to block 361(N)(1) (since its metric is below the threshold minimum), a budget of 15 KB to block 361(N)(2), a budget of 40 KB to block 361(N)(3), and a budget of 45 KB to block 361(N)(4). Operation then proceeds with step 250.

In step 250, EL encoder creates a set 374(1) of mappings 375 (see FIG. 4C) that transforms chroma values of particular pixels (see FIG. 4B) of the decoded BL stream 84 into enhanced chroma values that have higher chroma fidelity to that of the original video stream 52 than does the decoded BL stream 84 alone. It should be understood that step 250 may be performed in a degenerate sense; in other words, if step 250 had already created the set 374(1) of mappings 375 for a previous identical decoded BL frame block 361(N−1)(1), 361(N−2)(1), etc., then there is no need to repeat step 250 on the identical data.

Figure 4B:
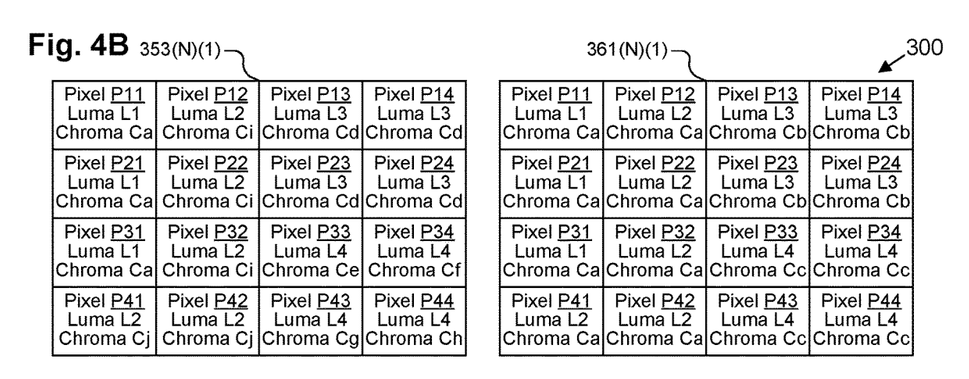

Reference is now made to FIG. 4B, which also depicts the data structure arrangement 300 from FIG. 4A but from a different view. Video frame blocks 353(N)(1), 361(N)(1) are depicted as each being made up of 4×4 pixels (a top row of pixels P11, P12, P13, and P14; a second row of pixels P21, P22, P23, and P24; a third row of pixels P31, P32, P33, and P34; and a bottom row of pixels P41, P42, P43, and P44). Each pixel in video frame blocks 353(N)(1), 361(N)(1) has a particular luma value and chroma value as depicted in FIG. 4B. It should be understood that the chroma value may include multiple channels of chroma information (i.e., each chroma value is actually a pair or other tuple of values). In the example, decoded BL frame block 361(N)(1) is chroma subsampled to 4:2:0, so certain groups of four pixels all have equal chroma values; thus within decoded BL frame block 361(N)(1), pixels P11, P12, P21, and P22 share a single chroma value Ca; pixels P13, P14, P23, and P24 share a single chroma value Cb; pixels P31, P32, P41, and P42 share a single chroma value which also happens to be Ca; and pixels P33, P34, P43, and P44 share a single chroma value Cc. As depicted, the original video frame block 353(N)(1) and the decoded BL frame block 361(N)(1) share the same luma values, although it should be understood that it is possible that there could be slight variations between the luma values of the original video frame block 353(N)(1) and the luma values of the decoded BL frame block 361(N)(1) due to the use of lossy compression. It should be noted, however, that there are significant differences between the chroma values of many of the pixels of decoded BL frame block 361(N)(1) and the corresponding pixels of original video frame block 353(N)(1) due to chroma subsampling.

Returning to FIG. 3, in some embodiments, step 250 is implemented by performing sub-steps 252-260. In sub-step 252, for each pixel of the decoded BL frame block 361(N)(1), EL encoder 70 records a mapping from a color of the pixel to a chroma delta in comparison to the same pixel in the original video frame block 353(N)(1). In some embodiments, the color of the pixel within the decoded BL frame block 361(N)(1) used for the mapping includes just the chroma information, while in other embodiments (as depicted in FIG. 4B), it includes both the luma and the chroma information.

For example, applying sub-step 252 to the decoded BL frame block 361(N)(1) in comparison to the original video frame block 353(N)(1), pixel P11 has a color L1Ca (interpreted as a luma value of L1 and a chroma value of Ca), which maps to a chroma delta of zero (since pixel P11 of the original video frame block 353(N)(1) also has color L1Ca). Pixels P21 and P31 also have the same mapping. Pixel P41 has a color L2Ca, which maps to a chroma delta of Cj-Ca because the chroma value Ca of pixel P41 in the BL frame block 361(N)(1) should have the value Cj-Ca added to it in order to be corrected to the chroma value of Cj as found in the pixel P41 in the original video frame block 353(N)(1). The complete set of mappings is presented in Table 1:

TABLE 1

| P11: L1Ca→0 | P12: L2Ca→Ci-Ca | P13: L3Cb→Cd-Cb | P14: L3Cb→Cd-Cb |
| P21: L1Ca→0 | P22: L2Ca→Ci-Ca | P23: L3Cb→Cd-Cb | P24: L3Cb→Cd-Cb |
| P31: L1Ca→0 | P32: L2Ca→Ci-Ca | P33: L4Cc→Ce-Cc | P34: L4Cc→Cf-Cc |
| P41: L2Ca→Cj-Ca | P42: L2Ca→Cj-Ca | P43: L4Cc→Cg-Cc | P44: L4Cc→Ch-Cc |

Figure 4C:
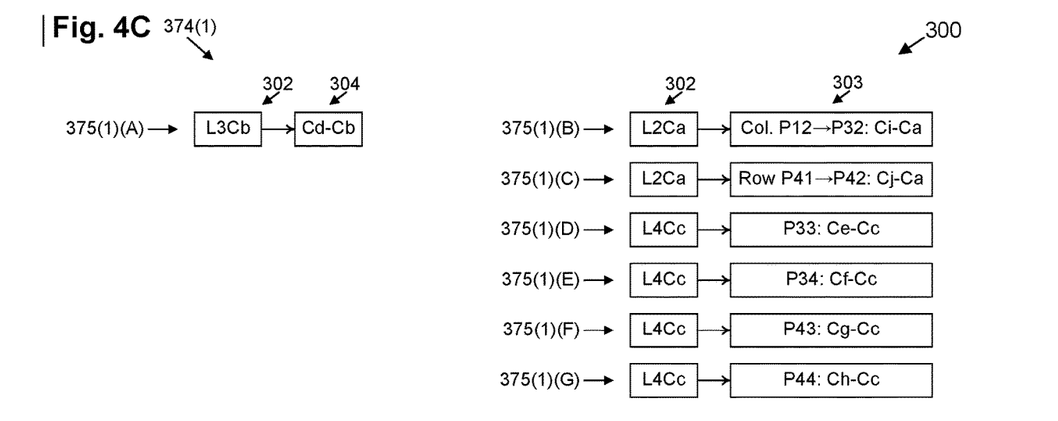

Sub-steps 254, 256 will initially be described in connection with a first embodiment as depicted in FIG. 4C. In sub-step 254, for colors that map to only one unique chroma delta for all pixels in the decoded BL frame block 361(N)(1), EL encoder 70 adds that information as mappings 375 to the set 374(1) for that decoded BL frame block 361(N)(1). It should be understood that set 374(1) is associated with decoded BL frame block 361(N)(1), while other decoded BL frame blocks 361(N)(2-4) for the current decoded BL frame 360(N) have respective sets 374(2-4) (not depicted). Thus, in this example, since color L3Cb only maps to chroma delta Cd-Cb within the decoded BL frame block 361(N)(1), as depicted in the embodiment of FIG. 4C, EL encoder 70 adds mapping 375(1)(A) to the set 374(1) which maps a color 302 with value L3Cb to a chroma delta 304 with value Cd-Cb. In some embodiments (not depicted), a mapping of color L1Ca to a chroma delta of zero is also added as a mapping 375, but in the embodiment as depicted, this kind of degenerate mapping is excluded.

In sub-step 256, for colors that map to more than one chroma delta in the decoded BL frame block 361(N)(1), EL encoder 70 adds several mappings 375 to the set 374(1) for that decoded BL frame block 361(N)(1) which are constrained by location. Thus, in this example, since color L2Ca maps to more than one chroma delta within the decoded BL frame block 361(N)(1), as depicted in the embodiment of FIG. 4C, EL encoder 70 adds more than one mapping 375(1)(B), 375(1)(C) to the set 374(1) which map a color 302 with value L2Ca to respective location-constrained chroma deltas 303. Thus, mapping 375(1)(B) maps color 302 with value L2Ca to a chroma delta Ci-Ca for pixels within a range defined by a partial column P12-P32 (i.e., pixels P12, P22, P32), and mapping 375(1)(C) maps color 302 with value L2Ca to a chroma delta Cj-Ca for pixels within a range defined by a partial row P41-P42 (i.e., pixels P41, P42). In addition, since color L4Cc also maps to several different chroma deltas within the decoded BL frame block 361(N)(1), as depicted in the embodiment of FIG. 4C, EL encoder 70 adds more than one mapping 375(1)(D), 375(1) (E), 375(1)(F), 375(1)(G) to the set 374(1) which map a color 302 with value L4Cc to respective location-constrained chroma deltas 303. Thus, mapping 375(1)(D) maps color 302 with value L4Cc to a chroma delta Ce-Cc for pixel P33, mapping 375(1)(E) maps color 302 with value L4Cc to a chroma delta Cf-Cc for pixel P34, mapping 375(1)(F) maps color 302 with value L4Cc to a chroma delta Cg-Cc for pixel P43, and mapping 375(1)(G) maps color 302 with value L4Cc to a chroma delta Ch-Cc for pixel P44.

Figure 4D:
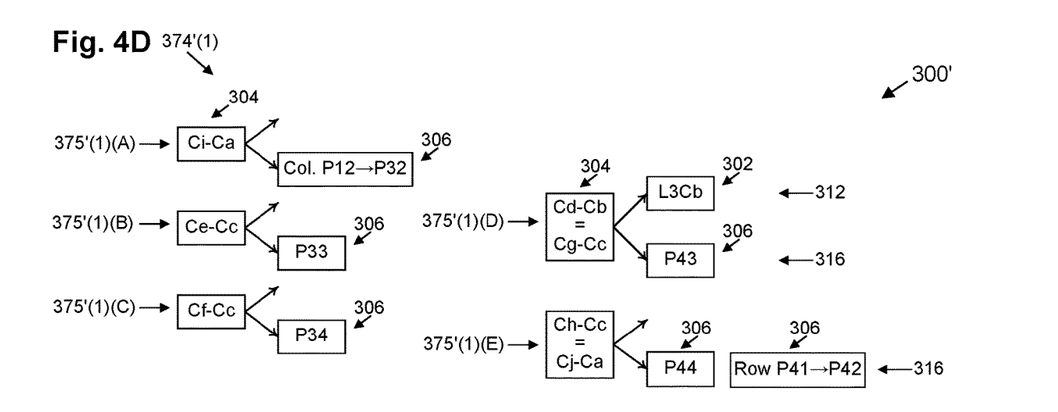

In some embodiments, as depicted in alternate arrangement 300' of FIG. 4D, step 250 includes sub-step 260, in which EL encoder 70 reverses these mappings 375 into a set 374' of reversed mappings 375' so that chroma deltas 304 map to respective lists 312, 316. Each chroma delta 304 can map to a list 312 of colors 302 and/or to a list 316 of pixel locations 306. Advantageously, in embodiments in which sub-step 260 is performed, set 374' is typically smaller than set 374 due to having less repetitive information. In addition, to the extent that chroma delta values 304 from different mappings 375 happen to be equal, set 374' is further decreased in size since fewer mappings 375, 375' are needed. For example, as depicted in FIG. 4D, chroma delta Cd-Cb happens to be equal to Cg-Cc; therefore they share mapping 375'(1)(D). Similarly, chroma delta Ch-Cc happens to be equal to Cj-Ca; therefore they share mapping 375'(1) (E). It should be understood that set 374'(1) is associated with decoded BL frame block 361(N)(1), while other decoded BL frame blocks 361(N)(2-4) for the current decoded BL frame 360(N) have respective sets 374'(2-4) (not depicted).

Thus, as depicted in FIG. 4D, reversed mapping 375'(1) (E) is a constrained mapping that maps a chroma delta 304 (i.e., Cj-Ca, which happens to be equal to Ch-Cc in this example) to a list 316 of position entries 306. List 316 includes a position entry 306 defining pixel positions P41 through P42, indicating that chroma delta Cj-Ca should be applied to pixels P41 and P42 without any need to include the information that the decoded BL frame block 361(N)(1) happens to have a color L2Ca at those positions. In addition, as depicted, because the value of Cj-Ca happens to be equal to the chroma delta Ch-Cc, therefore, within reversed mapping 375'(1)(E), list 316 also includes a position entry 306 defining pixel position P44, indicating that chroma delta Ch-Cc (which is equal to Cj-Ca) should be applied to pixel P44 without any need to include the information that the decoded BL frame block 361(N)(1) happens to have a color L4Cc at that position. As additional examples, reversed mapping 375'(1)(A) is a constrained mapping that maps a chroma delta 304 (i.e., Ci-Ca) to a location entry 306 defining a partial column of pixel locations P12 through P32 (i.e., pixel locations, P12, P22, and P32); reversed mapping 375'(1)(B) is a constrained mapping that maps a chroma delta 304 (i.e., Ce-Cc) to a location entry 306 defining a pixel location of P33; and reversed mapping 375'(1)(C) is a constrained mapping that maps a chroma delta 304 (i.e., Cf-Cc) to a location entry 306 defining a pixel location of P34. In addition, reversed mapping 375'(1)(D) is a dual constrained/unconstrained mapping that maps a chroma delta 304 (i.e., Cg-Cc, which happens to be equal to the chroma delta Cd-Cb) to both a list 312 of color entries 302 and a list 316 of location entries 306. As depicted, list 312 includes a single color entry 302 that defines a color value of L3Cb, and list 316 includes a single location entry 306 that defines a location of P43. Thus, reversed mapping 375'(1)(D) describes a mapping where the chroma delta 304 (i.e., Cg-Cc, which happens to be equal to the chroma delta Cd-Cb) should be applied to all pixels with color L3Cb in the current decoded BL frame block 361(N)(1), as well as to the pixel at position P43.

After step 250, operation proceeds to optional step 270. In step 270, EL encoder 70 excludes some of the mappings 375 (or, in other embodiments, reversed mappings 375', mention of which is omitted henceforth) from inclusion within the set 374(1) that are placed within the current EL frame buffer 74 to be sent within the EL stream 76 for the current frame. In some embodiments, this may include sub-steps 272 and 274. In sub-step 272, EL encoder 70 sorts the mappings 375 within each set 374 by visual impact, for example, by sorting from highest chroma delta 304 to lowest chroma delta 304 in one embodiment. Other embodiments may use other visual impact sorting criteria, e.g. image saliency metrics, machine learning based metrics, or region of interest weights, etc. Then, in sub-step 274, EL encoder 70 includes only as many mappings 375 within the current EL frame buffer 74 as will fit based on the data rate budget that was assigned to the current decoded BL frame block 361(N)(1) in step 240. Originally, sub-step 274 involves including only the mappings 375 that have the highest visual impact (e.g., the largest chroma deltas 375) until the combined size reaches the assigned budget. In some embodiments, the ultimate size after entropy encoding (see step 290) is estimated, while in other embodiments, steps 270 and 290 are performed in conjunction. In some embodiments, after the first improvement, additional mappings 375 that were omitted in the previous EL frame buffer 72 are placed into the current EL frame buffer 74 instead of the mappings 375 that were included in the previous EL frame buffer 72 (since those mappings 375 have already been sent within the EL stream 76 for the previous frame, so the EL decoder 86 already has access to them).

Then, in optional step 280, EL encoder 70 compares the current set 374(1) of mappings 375 to the set 374(1) of mappings 375 that was used for the immediately-previous frame block 361(N−1) of the video stream 84. If both sets 374(1) are equal (or at least if the new set 374(1) does not include any new or contradictory mappings 375), operation can proceed with step 285. In step 285, a static mapping flag (not depicted) may be set within the EL stream 76 for the current frame block 361(N)(1) to indicate to an EL-enabled receiver device 80(H) that the previously-sent mappings 375 should be re-used. Then, in step 225 the previously-sent mappings 375 are relied upon by not sending any new mappings 375 within the EL stream 76 for the current frame block 361(N)(1). If, however, the current set 374(1) of mappings 375 includes a significant overlap with the set 374(1) of mappings 375 that was used for the immediately-previous frame block 361(N−1) but also includes at least one new mapping 375, then, in some embodiments, operation may instead proceed with step 288 in which the static mapping flag is set and the overlapping mappings 375 are removed from the current EL frame buffer 74 so that they are not redundantly sent within the EL stream 76. Regardless of whether step 288 is performed, operation proceeds with optional step 290. In some embodiments, steps 280, 285, and 288 may precede step 270 instead of following step 270.

In step 290, EL encoder 70 performs entropy encoding (e.g., Huffman encoding, RLE encoding, arithmetic coding, etc.) on the set 374 of mappings 375 included within the current EL frame buffer 74 to reduce their size in a lossless manner.

Figure 5:
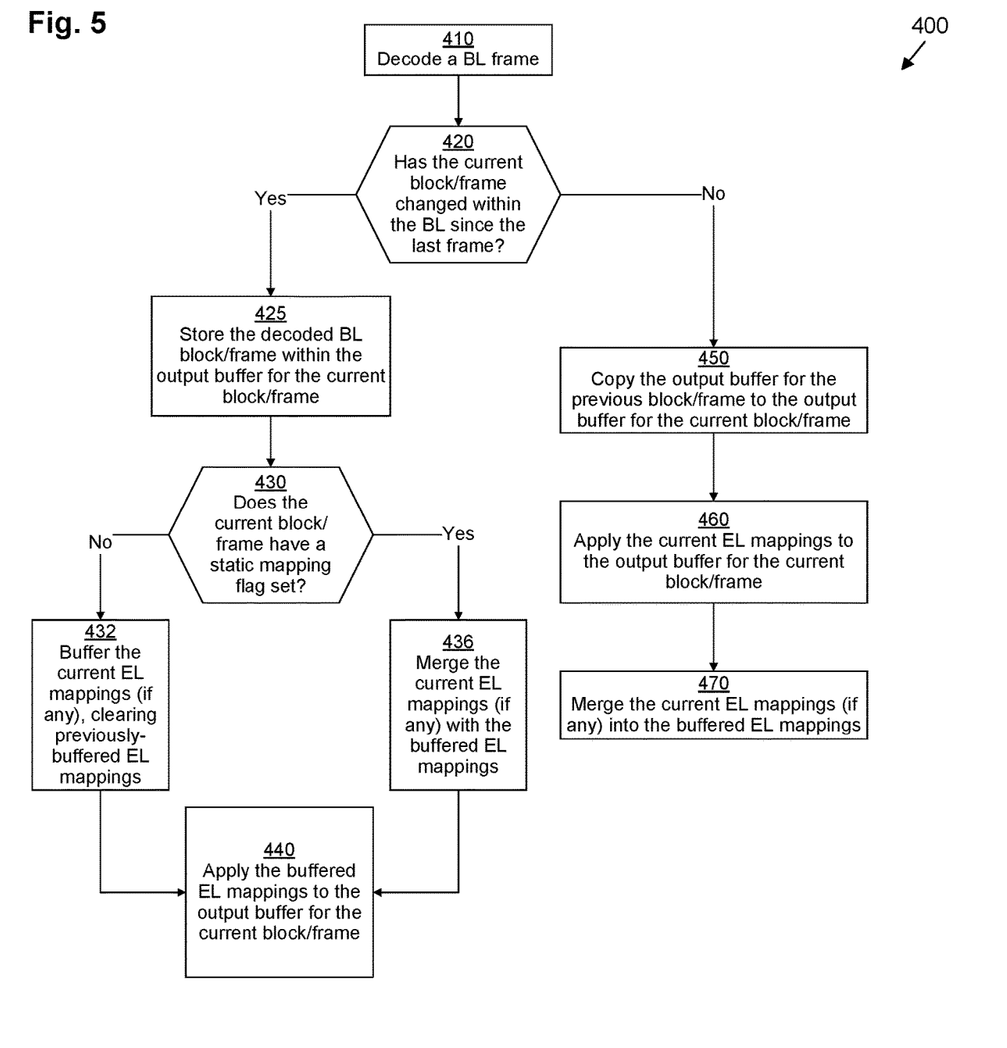
FIG. 5 is a flowchart depicting example methods of various embodiments.

FIG. 5 depicts a method 400 performed by an EL-enabled receiver device 80(H) for processing a received BL stream 62 and EL stream 76 into an enhanced stream 92 for display on its display 47. It should be understood that one or more of the steps or sub-steps of FIG. 5 may be omitted in some embodiments. It should also be understood that method 400 may overlap with steps 170-190 of method 100.

In step 410, BL decoder 82 decodes a current frame of the BL stream 62 to yield a decoded BL frame N 360(N) of decoded BL stream 84. Operation then proceeds with step 420.

In some embodiments, EL decoder 86 iterates through the various blocks 361 and decodes chroma enhancement information for each block 361. In other embodiments, EL decoder 86 performs the chroma enhancement for the entire frame 360(N) without breaking it down into constituent blocks 361. FIG. 5 will be described in the context of application to current BL decoded frame N, block 1 361(N)(1), but it should be understood that operation on any block 361 within the current BL decoded frame N 360(N) is similar. It should also be understood that in embodiments in which the method 150 of FIG. 3 applies to the entire frame 360(N), operation is similar, but applied on a frame-wide basis.

In step 420, for each block 361 of the decoded BL frame N 360(N), EL decoder 86 (or, in some embodiments, stream assembler 90) determines whether or not the decoded BL frame block 361(N)(1) has changed at all since the previous decoded BL frame block 361(N−1)(1). In some embodiments, this is a simple determination—if no BL changes were sent for the current frame block, then clearly the decoded BL frame block 361(N)(1) has not changed, so BL decoder 82 may communicate this to the EL decoder 86 or stream assembler 90. In other instances, BL decoder 82 may not output such information, so EL decoder 86 or stream assembler 90 may be required to make this determination by comparing frame buffers. If the output of step 420 is affirmative (indicating that the decoded BL frame block 361(N)(1) is different than decoded BL frame block 361(N−1)(1)), then operation proceeds with step 425. If the output of step 420 is negative (indicating that the decoded BL frame block 361(N)(1) is the same as decoded BL frame block 361(N−1)(1)), then operation proceeds with step 450.

In step 425, EL decoder 86 stores the current decoded BL frame block 361(N)(1) within an output buffer (not depicted) of the enhanced stream 92. Then, in step 430, EL decoder 86 determines whether or not a static mapping flag has been set within the decoded EL stream 88 for the current decoded BL frame block 361(N)(1). If step 430 has an affirmative result, then operation proceeds with step 436 in which EL decoder 86 merges the mappings 375 currently received within the decoded EL stream 88 with previously-buffered mappings 375 received for use with the previous frame block 361(N−1)(1) (replacing contradictory entries with entries consistent with the newly-received mappings 375) to yield new buffered mappings 375. Operation then proceeds with step 440 (described below).

However, if step 430 has a negative result, then operation proceeds with step 432. In step 432, EL decoder 86 clears any previously-buffered mappings 375 and instead newlybuffers the mappings 375 currently received within the decoded EL stream 88. Operation then proceeds with step 440.

In step 440, stream assembler 90 applies the new buffered mappings 375 (whether from step 432 or 436) to the output buffer of the enhanced stream 92 (which already contains the current frame block 361(N)(1) of the decoded BL stream 84; see above at step 425) for the current frame block to yield the new output buffer of the enhanced stream 92.

In step 450, EL decoder 86 copies the output buffer for the block of the previous frame of the enhanced stream 92 (i.e., decoded frame block 361(N−1)(1) as previously-improved by mappings in a previous iteration of either step 440 or 460) into a new output buffer of the enhanced stream 92 for the current frame.

Then, in step 460, stream assembler 90 applies the new mappings 375 received within the decoded EL stream 88 to the already-extant output buffer of the enhanced stream 92 (as copied in step 450, based on a previous iteration of step 440 or 460) to yield an updated output buffer of the enhanced stream 92. Operation proceeds with step 470 in which EL decoder 86 merges the mappings 375 currently received within the decoded EL stream 88 with previously-buffered mappings 375 received for use with the previous frame block 361(N−1)(1) (replacing contradictory entries with entries consistent with the newly-received mappings 375) to yield new buffered mappings 375.

The output buffer of the enhanced stream 92 as generated in steps 440, 460 is displayed on display 47 of the EL-enabled receiver device 80(H).

Thus, techniques have been presented for implementing an enhancement layer that is configured to provide enough information to allow a client device 80(H) to generate a reconstructed version of the original video stream 52 (e.g., of a shared desktop screen) while reducing or eliminating the artifacts introduced by chroma subsampling of a compressed base layer stream 62 of the transmitted video. This result may be accomplished by generating the enhancement layer stream 76 based on both the original video stream 52 (prior to chroma subsampling) and a decoded version of the chroma-subsampled base layer (found within DPB 64) using an enhancement layer encoder 70. Since the enhancement layer encoder 70 has access to the artifact-free video stream 52 prior to chroma subsampling, it is able to use techniques described herein to enhance the base layer stream 62 with better chroma data. The enhancement layer stream 76 output by the enhancement layer encoder 70 may be sent to compatible client devices 80(H) together with the base layer stream 62 to allow the decoded chroma-subsampled video 84 to be enhanced at the client 80(H) to provide higher chroma fidelity.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

As another example, although various embodiments have been described as being implemented in software executing on a general-purpose processor, it should be understood that this is by way of example. In some embodiments, all or some portions of the methods may be implemented directly in hardware.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by a computing device of sending digital video in high-quality compressed form over a network, the method comprising:

performing chroma subsampling on an original video stream to yield an altered video stream whose chroma resolution is lower than its luma resolution;

applying video compression to the altered video stream to yield a compressed base layer (BL) stream;

creating an enhancement layer (EL) stream based on differences between the original video stream and a decompressed version of the BL stream, the EL stream including additional chroma information, which, when combined with the BL stream, encodes a video stream that has higher chroma fidelity to that of the original video stream than does the BL stream alone, wherein creating the EL stream includes creating a set of mappings that transforms chroma values of particular pixels of the decompressed version of the BL stream into enhanced chroma values that have higher chroma fidelity to that of the original video stream than does the BL stream alone; and sending both the BL stream and the EL stream to a receiver device across the network to enable the receiver device to generate a version of the original video stream by combining the BL stream with the additional chroma information of the EL stream.

2. The method of claim 1,
wherein creating the set of mappings includes determining a chroma delta for each mapping, each chroma delta providing a measure of difference between a chroma value for a particular pixel and an enhanced chroma value for the particular pixel representative of a chroma value of the particular pixel in the original video stream; and
wherein creating the EL stream further includes excluding a subset of the set of mappings based on their respective chroma deltas.

3. The method of claim 2 wherein excluding the subset of the set of mappings based on their respective chroma deltas includes:
sorting the mappings from largest visual impact to smallest visual impact with reference to their respective chroma deltas; and
omitting from the EL a plurality of mappings that have lowest visual impacts.

4. The method of claim 3,
wherein creating the EL stream further includes:
evaluating a relative priority of various contiguous blocks of pixels within a frame of the original video stream; and
assigning a data rate budget to each different contiguous block of pixels, blocks having higher relative priorities having higher data rate budgets than blocks having lower relative priorities;
wherein creating the set of mappings is performed separately for each different block; and
wherein omitting from the EL the plurality of mappings that have the lowest visual impacts includes, for each different block, encoding mappings of the set of mappings starting from the highest visual impact until a size of the encoded mappings reaches the data rate budget assigned to that block.

5. The method of claim 4 wherein evaluating the relative priority of different contiguous blocks of pixels includes estimating a strength of chroma subsampling artifacts of each block using gradient analysis, blocks estimated to show stronger chroma subsampling artifacts being assigned relatively higher priorities than blocks estimated to show weaker chroma subsampling artifacts.

6. The method of claim 5 wherein estimating the strength of chroma subsampling artifacts of each block using gradient analysis includes making reference to the altered video stream.

7. The method of claim 2 wherein excluding the subset of the set of mappings based on their respective chroma deltas includes omitting from the EL at least one mapping that was previously sent to the receiver device as part of the EL stream for a previous frame.

8. The method of claim 1 wherein creating the set of mappings includes assigning a set of chroma deltas to be selectively applied to particular pixels within the decompressed version of the BL stream based on one of (i) a color value of the particular pixels and (ii) a location of the particular pixels, applying a chroma delta to a pixel yielding a corrected color value for that pixel.

9. The method of claim 1 wherein sending both the BL stream and the EL stream to the receiver device includes omitting the set of mappings from the EL stream sent to the receiver device for a block of a first frame that has a same set of mappings as a block of an immediately preceding frame.

10. The method of claim 1 wherein creating the set of mappings includes:
for each block of a set of blocks of a frame, determining whether that block within the original video stream for a first frame is different than that block within the original video stream for an immediately preceding frame;
in response to determining that a first block is not different than that block within the original video stream for the immediately preceding frame, creating the set of mappings for that block; and
in response to determining that a second block is different than that block within the original video stream for the immediately preceding frame, refraining from creating the set of mappings for that block.

11. The method of claim 1 wherein creating the set of mappings includes:
for each block of a set of blocks of a frame, determining whether that block within the original video stream for a first frame is different than that block within the original video stream for an immediately preceding frame;
in response to determining that a first block is not different than that block within the original video stream for the immediately preceding frame, determining whether the EL stream for that block in the immediately preceding frame was missing mapping information;
in response to determining that the EL stream for that block in the immediately preceding frame was missing mapping information, creating an updated set of mappings for that block;
in response to determining that the EL stream for that block in the immediately preceding frame was not missing mapping information, refraining from creating an updated set of mappings for that block; and
in response to determining that a second block is different than that block within the original video stream for the immediately preceding frame, refraining from creating the set of mappings for that block.

12. A computer program product comprising a non-transitory computer-readable storage medium storing a set of instructions, which, when executed by a computing device, causes the computing device to send digital video in high-quality compressed form over a network by performing the method of claim 1.

13. A system comprising:
a network;
a sender device communicatively coupled to the network; and
a receiver device communicatively coupled to the network;
wherein the sender device is a computing device configured to send digital video in high-quality compressed form over the network to the receiver device by:
performing chroma subsampling on an original video stream to yield an altered video stream whose chroma resolution is lower than its luma resolution;
applying video compression to the altered video stream to yield a compressed base layer (BL) stream;
creating an enhancement layer (EL) stream based on differences between the original video stream and a decompressed version of the BL stream, the EL stream including additional chroma information, which, when combined with the BL stream, encodes a video stream that has higher chroma fidelity to that of the original video stream than does the BL stream alone, wherein creating the EL stream includes creating a set of mappings that transforms chroma values of particular pixels of the decompressed version of the BL stream into enhanced chroma values that have higher chroma fidelity to that of the original video stream than does the BL stream alone; and
sending both the BL stream and the EL stream to the receiver device across the network; and
wherein the receiver device is a computing device configured to generate and display a version of the original video stream by combining the BL stream with the additional chroma information of the EL stream.

14. The system of claim 13 wherein the system further comprises another receiver device communicatively coupled to the network, the other receiver device being a computing device configured to decode the BL stream and to display the decoded BL stream without reference to the EL stream.

15. A computer program product comprising a non-transitory computer-readable storage medium storing a set of instructions, which, when executed by a computing device, causes the computing device to generate and display an enhanced video by:
receiving, from a sender device across a computer network, a base-layer (BL) video stream encoded according to a low-complexity profile of a video codec using chroma subsampling;
receiving, from the sender device across the computer network, an enhancement layer (EL) stream which includes additional chroma information including a set of mappings that transforms chroma values of particular pixels of a decompressed version of the BL stream into enhanced chroma values that have higher chroma fidelity to that of the original video stream than does the BL stream alone;
decoding the BL video stream to yield a decoded BL stream;
applying the additional chroma information received within the EL stream to the decoded BL stream to yield an enhanced output video stream that has higher chroma fidelity to that of an original video stream of the sender device than does the BL stream alone; and
displaying the enhanced output video stream on a display screen.

16. The computer program product of claim 15 wherein applying the additional chroma information received within the EL stream to the decoded BL stream includes merging the set of mappings received within the additional chroma information for a current video frame with buffered previously-received mappings used in conjunction with a previous video frame.

17. The computer program product of claim 16 wherein merging the set of mappings received within the additional chroma information for the current video frame with buffered previously-received mappings used in conjunction with the previous video frame is performed in response to determining that the additional chroma information for the current video frame includes a static mapping flag indicating that at least some of the buffered previously-received mappings remain valid.

18. The computer program product of claim 15 wherein applying the additional chroma information received within the EL stream to the decoded BL stream includes:
for a first video frame of the BL stream that includes a first block of pixels that is identical to a corresponding block of pixels in an immediately-previous video frame of the BL stream, applying a set of mappings including mappings received within the additional chroma information for the first video frame, to enhance the chroma fidelity of the pixels of the block within the first frame; and
for a second video frame of the BL stream that includes a second block of pixels that is different from a corresponding block of pixels in an immediately-previous video frame of the BL stream, refraining from applying any mappings to enhance the chroma fidelity of the pixels of the block within the second frame.

19. The method of claim 1,
wherein creating the set of mappings includes determining a chroma delta for each mapping, each chroma delta providing a measure of difference between a chroma value for a particular pixel and an enhanced chroma value for the particular pixel representative of a chroma value of the particular pixel in the original video stream; and
wherein creating the EL stream further includes:
evaluating a priority for each block of a set of contiguous blocks of pixels within a frame of the original video stream; and
assigning a data rate budget to each block of the set, blocks having higher priorities being assigned higher data rate budgets than blocks having lower priorities; and
omitting from the EL stream a plurality of mappings that have lowest visual impacts by, for each different block, encoding mappings of the set of mappings in order from highest visual impact to lowest visual impact until a size of the encoded mappings reaches the data rate budget assigned to that block.

* * * * *